(12) United States Patent
    Zheng

(10) Patent No.: US 11,176,279 B2
(45) Date of Patent: Nov. 16, 2021

(54) METHOD FOR IDENTITY VERIFICATION, CONSUMABLE BOX AND STORAGE MEDIUM

(71) Applicant: GUANGZHOU ZHONO ELECTRONIC TECHNOLOGY CO., LTD., Guangzhou (CN)

(72) Inventor: Dexin Zheng, Guangzhou (CN)

(73) Assignee: GUANGZHOU ZHONO ELECTRONIC TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/043,756

(22) PCT Filed: Dec. 31, 2019

(86) PCT No.: PCT/CN2019/130467
    § 371 (c)(1),
    (2) Date: Sep. 30, 2020

(87) PCT Pub. No.: WO2020/207068
    PCT Pub. Date: Oct. 15, 2020

(65) Prior Publication Data
    US 2021/0056235 A1    Feb. 25, 2021

(30) Foreign Application Priority Data
    Apr. 8, 2019  (CN) .......................... 201910277332.7

(51) Int. Cl.
    *G06F 1/26*    (2006.01)
    *G06F 11/00*   (2006.01)
    (Continued)

(52) U.S. Cl.
    CPC .............. *G06F 21/73* (2013.01); *G06F 21/44* (2013.01)

(58) Field of Classification Search
    CPC .................................. G06F 21/73; G06F 21/44
    See application file for complete search history.

(56) References Cited

U.S. PATENT DOCUMENTS

2003/0233548 A1* 12/2003 Moreaux ............... G07F 7/1016
                                                         713/168
2004/0181681 A1   9/2004 Salisbury
                         (Continued)

FOREIGN PATENT DOCUMENTS

CN     104102106 A    10/2014
CN     105398225 A     3/2016
            (Continued)

*Primary Examiner* — Amie C. Lin

(57) ABSTRACT

A method for identity verification, a consumable box and a storage medium are provided. The method includes a first key verification and a second key verification. The second key verification includes: receiving, by a consumable chip, a reading instruction for serial number reading; sending, by the consumable chip, a first serial number based on the reading instruction; sending, by the consumable chip, a first status code in response to a first verification code, wherein the first verification code is obtained based on the first serial number; receiving again, by the consumable chip, the reading instruction for serial number reading; and sending, by the consumable chip, a second serial number based on the reading instruction, and completing, the identity verification based on the second serial number.

14 Claims, 5 Drawing Sheets

(51) Int. Cl.
*G08B 13/00* (2006.01)
*G08B 21/00* (2006.01)
*G08B 29/00* (2006.01)
*G06F 21/73* (2013.01)
*G06F 21/44* (2013.01)

(56) References Cited

U.S. PATENT DOCUMENTS

| | | |
|---|---|---|
| 2008/0174618 A1 | 7/2008 | Sugahara et al. |
| 2012/0254050 A1 | 10/2012 | Scrafford et al. |
| 2013/0321853 A1* | 12/2013 | Lee ........................ H04N 1/4433 |
| | | 358/1.14 |
| 2014/0164725 A1* | 6/2014 | Jang ........................ G06F 21/84 |
| | | 711/163 |
| 2015/0110504 A1* | 4/2015 | Lee ........................ G03G 15/55 |
| | | 399/12 |
| 2015/0206039 A1* | 7/2015 | Liu ........................ G06K 15/12 |
| | | 358/1.15 |
| 2018/0326735 A1 | 11/2018 | Zhang et al. |
| 2019/0073572 A1* | 3/2019 | Liu ........................ G06F 21/608 |

FOREIGN PATENT DOCUMENTS

| | | |
|---|---|---|
| CN | 105538917 A | 5/2016 |
| CN | 106626796 A | 5/2017 |
| CN | 107053854 A | 8/2017 |
| CN | 108446081 A | 8/2018 |
| CN | 108595128 A | 9/2018 |
| CN | 108734253 A | 11/2018 |
| CN | 108804953 A | 11/2018 |
| CN | 108819486 A | 11/2018 |
| CN | 109334259 A | 2/2019 |
| CN | 109977656 A | 7/2019 |

\* cited by examiner

METHOD FOR IDENTITY VERIFICATION, CONSUMABLE BOX AND STORAGE MEDIUM

CROSS-REFERENCE TO RELATED APPLICATIONS

This present application is a national phase of International Application No. PCT/CN2019/130467, filed on Dec. 31, 2019, which claims priority to Chinese Patent Application No. 201910277332.7 entitled "METHOD FOR IDENTITY VERIFICATION, CONSUMABLE BOX AND STORAGE MEDIUM" and filed with the CNIPA on Apr. 8, 2019, both of which are hereby incorporated by reference in their entireties.

TECHNICAL FIELD

The present disclosure relates to the technical field of imaging devices, and more particularly, to a method for identity verification, a consumable box, and a storage medium.

BACKGROUND

An imaging equipment such as a printer, a copier, a facsimile machine, a word processor, a multifunction machine, or the like is provided with a removable consumable box that is easily replaced by users. The consumable box is usually required to be provided with a consumable chip, and communicates with an imaging device of the imaging equipment through the consumable chip, so that the imaging device may ideally use the consumable box and internal consumable materials thereof such as carbon powder, ink and the like. The consumable chip has programs and consumable box data stored thereon, such as a version number, a model number, consumable allowance, and the like. In the imaging industry, each manufacturer has its own imaging equipment, consumable box, and consumable chip. Therefore, each type of consumable box such as a toner cartridge or an ink cartridge requires different types of consumable chips, and only the matched consumable chip can be applied to the imaging device.

In the related art, an imaging device of an imaging equipment obtains a key by reading a serial number of a consumable chip, and calculates a verification code based on the key, the consumable chip also calculates the verification code based on a pre-stored key, and the imaging device determines whether an identity of the consumable chip matches the imaging device by comparing the verification code calculated by itself with the verification code calculated by the consumable chip. In some schemes, the same process as above is repeated. Because the keys or the verification codes in different verification processes may be different, if the keys or the verification codes are the same in each verification process, verification may not be passed, and the accuracy of identity verification is reduced.

SUMMARY

The present disclosure aims to solve one of the technical problems in the related art.

In a first aspect of the present disclosure, a method for identity verification is provided, which can improve an accuracy of identity verification of a consumable chip.

In a second aspect of the present disclosure, another method for identity verification is provided.

In a third aspect of the present disclosure, a consumable box is provided.

In a fourth aspect of the present disclosure, a non-temporary computer readable storage medium is provided.

In order to solve the above problems, the method for identity verification provided by the embodiment of the first aspect of the present disclosure includes a first key verification and a second key verification. The second key verification includes: receiving, by a consumable chip, a reading instruction for serial number reading; sending, by the consumable chip, a first serial number based on the reading instruction; sending, by the consumable chip, a first status code in response to a first verification code, wherein the first verification code is obtained based on the first serial number, and the first status code is invalid; receiving again, by the consumable chip, the reading instruction for serial number reading; and sending, by the consumable chip, a second serial number based on the reading instruction, and completing the identity verification based on the second serial number.

With the method for identity verification according to the embodiments of the present disclosure, in verification of the second key, the consumable chip feeds back the first status code after receiving the first verification code, so that the reading instruction for serial number reading may be received again, and the changed serial number is fed back to the imaging device. The second serial number is used as an input for calculating the second key, and the legality of the consumable chip is determined through the verification of the second key. Compared with the related art in which the key is obtained only through a single serial number, the method according to the embodiment of the present disclosure has high challenge of key crack, the improved accuracy in identity verification of the consumable chip and the improved information security of the imaging device.

In some embodiments, said completing the identity verification based on the second serial number includes: receiving, by the consumable chip, a verification instruction of a verification code containing a second key and obtained based on the second serial number; obtaining, by the consumable chip, a second verification code and a second status code based on the second key and the verification instruction of the verification code containing the second key; and sending, by the consumable chip, the second verification code and the second status code, and completing the identity verification based on the second verification code and the second status code.

In some embodiments, the method further includes, prior to sending, by the consumable chip, the second verification code and the second status code: determining, by the consumable chip, whether the verification code of the second key is legal; and generating, by the consumable chip, the second verification code and the second status code, if the verification code of the second key is legal.

In some embodiments, the method further includes, after receiving the first verification code: changing, by the consumable chip, the first serial number into the second serial number.

In some embodiments, the first key verification includes: receiving, by the consumable chip, the reading instruction for serial number reading; sending, by the consumable chip, the first serial number based on the reading instruction; receiving, by the consumable chip, a verification instruction of a verification code containing a first key and obtained based on the first serial number; determining, by the consumable chip, whether the verification code containing the first key is legal; obtaining, by the consumable chip, a third verification code and a second status code based on the first key and the verification instruction of the verification code containing the first key, if the verification code containing the first key is legal; and sending, by the consumable chip, the third verification code and the second status code, and completing, by the consumable chip, verification of the first key based on the third verification code and the second status code.

In some embodiments, the method further includes, prior to verifying the first key: determining, by the consumable chip in response to the reading instruction for serial number reading, whether a serial number for responding to the reading instruction is the first serial number or not; and if not, changing, by a consumable chip, the serial number for responding to the reading instruction into the first serial number.

In some embodiments, said changing, by the consumable chip, the serial number for responding to the reading instruction into the first serial number includes: sending, by the consumable chip, the serial number for responding to the reading instruction; and feeding back, by the consumable chip in response to receiving a fourth verification code obtained based on the serial number, the first status code; and changing, by the consumable chip, the serial number for responding to the reading instruction into the first serial number, to ensure the normal operation of identity verification.

In order to solve the above problems, the method for identity verification provided by the embodiment of the second aspect of the present disclosure includes a first key verification and a second key verification. The second key verification includes: sending, by an imaging device, a reading instruction for serial number reading; receiving, by the imaging device, a first serial number; obtaining, by the imaging device, a first verification code based on the first serial number; sending, by the imaging device, the first verification code, and feeding back, by a consumable chip, a first status code in response to the first verification code, wherein the first status code is invalid; sending again, by the imaging device in response to the first status code, the reading instruction for serial number reading; and receiving, by the imaging device, a second serial number, and completing the identity verification based on the second serial number.

With the method for identity verification according to the embodiments of the present disclosure, in verification of the second key, the imaging device sends the reading instruction for serial number reading again in response to the first status code, and completes identity verification based on the second serial number. The second serial number is used as an input for calculating the second key, then the validity of the consumable chip is determined through the verification of the second key. Compared with the prior art in which the key is obtained only through a single serial number, the method according to the embodiment of the present disclosure has high challenge of key crack, the improved accuracy in identity verification of the consumable chip and the improved information security of the imaging device.

In some embodiments, said completing the identity verification based on the second serial number includes: obtaining, by the imaging device, a verification code containing a second key based on the second serial number, and sending, by the imaging device, a verification instruction of the verification code containing the second key; receiving, by the imaging device, a second verification code and a second status code, the second verification code and the second status code being obtained based on the second key and the verification instruction of the verification code containing the second key; determining whether the received second verification code matches a verification code calculated based on the second key, in response to the second status code being confirmed; and passing, by the imaging device, the identity verification, if the received second verification code matches the verification code calculated based on the second key.

In some embodiments, the first key includes: sending, by the imaging device, the reading instruction for serial number reading; receiving, by the imaging device, a first serial number; obtaining, by the imaging device, a verification code containing the first key based on the first serial number; and sending, by the imaging device, a verification instruction of the verification code containing the first key; receiving, by the imaging device, a third verification code and a second status code, the third verification code and the second status code being obtained based on the first key and the verification instruction of the verification code containing the first key; determining, by the imaging device, whether the received third verification code matches a verification code calculated based on the first key, in response to the second status code being confirmed; determining, by the imaging device, that the first key is legal, if the received third verification code matches the verification code calculated based on the first key; sending, by the imaging device, a reading instruction for reading data information; and receiving, by the imaging device, data information of the consumable chip, and after determining that the data information is legal, storing the first serial number.

In some embodiments, the method further includes: sending, by the imaging device, the reading instruction for serial number reading; receiving, by the imaging device, a second serial number; obtaining, by the imaging device, a fourth verification code based on the second serial number; and sending, by the imaging device, the fourth verification code; and sending again, by the imaging device in response to the first status code fed back based on the fourth verification code, the reading instruction for serial number reading.

In order to solve the above problems, the consumable box provided by the embodiment of the third aspect of the present disclosure includes a box body; and a consumable chip arranged on the box body. The method for identity verification according to the above embodiments is applied for identity verification of the consumable chip.

The consumable box according to the embodiment of the present disclosure, the consumable chip adopts the method for identity verification of the above embodiments, so that the accuracy of identity verification of the consumable chip, the verification logic and safety can be improved.

The computer readable storage medium provided by the embodiment of the fourth aspect of the present disclosure has a computer program stored thereon. The computer program is configured to, when being executed, perform the method for identity verification according to the above embodiments.

BRIEF DESCRIPTION OF DRAWINGS

The above and/or additional aspects and advantages of the present disclosure will become apparent and readily appreciated from the following description of the embodiments, taken in conjunction with the accompanying drawings, in which.

DESCRIPTION OF EMBODIMENTS

Figure 1:
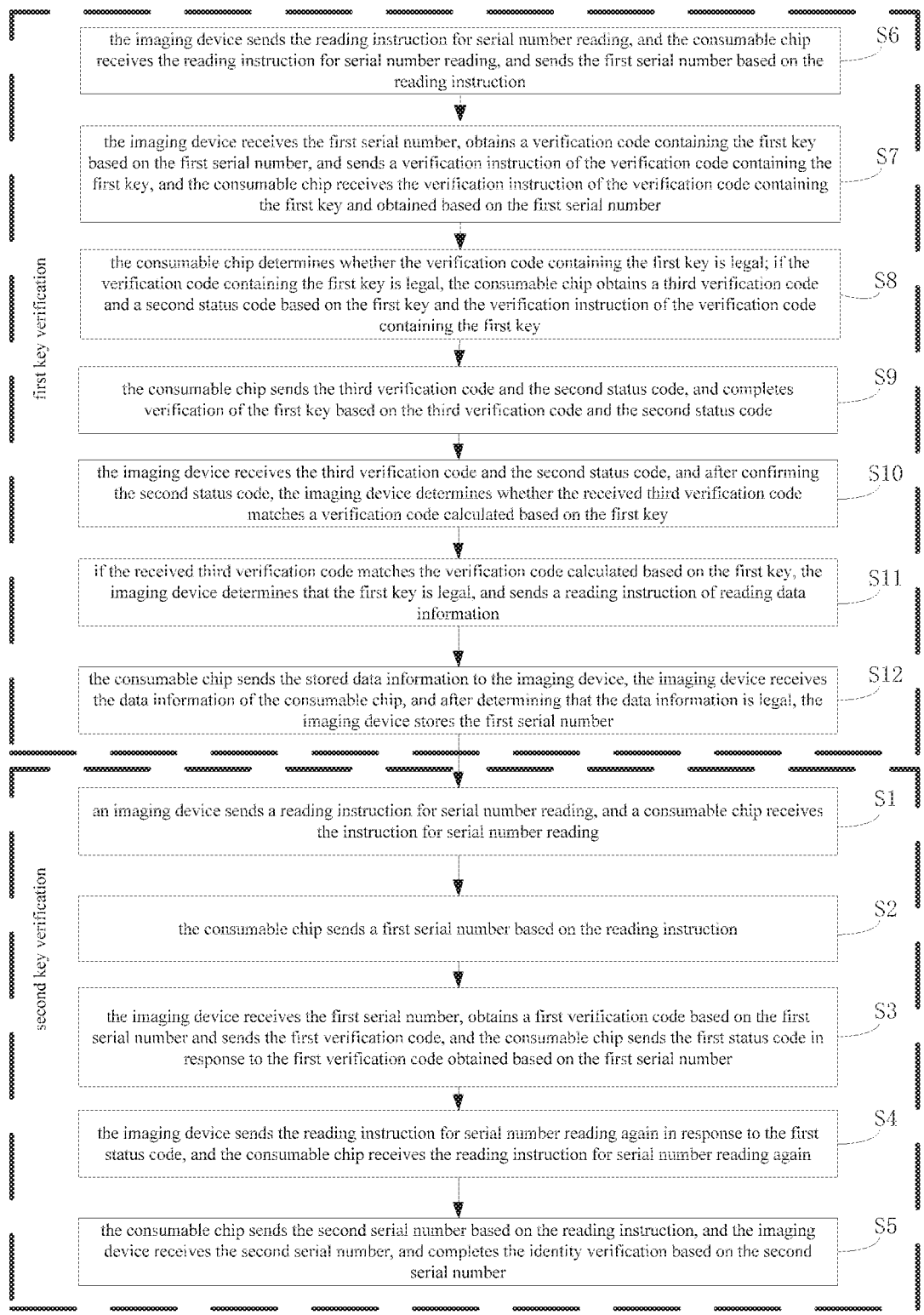
FIG. 1 is a flowchart of a method for identity verification according to an embodiment of the present disclosure.

The embodiments of the present disclosure will be described in detail below, and examples of the embodiments are illustrated in the accompanying drawings, in which the same or similar reference numerals refer to the same or similar elements or elements having the same or similar functions throughout. The embodiments described below with reference to the accompanying drawings are illustrative and intended to explain the present disclosure, and shall not be construed as limiting the present disclosure.

A method for identity verification according to embodiments of the present disclosure will be described below with reference to the accompanying drawings.

FIG. 1 is a flowchart of a method for identity verification according to embodiments of the present disclosure.

As shown in FIG. 1, the method for identity verification according to the embodiments of the present disclosure includes a first key verification and a second key verification. That is, the method according to the present disclosure adopts a double verification mode.

The first key verification process may be similar to an identity verification process of the consumable chip in the related art. The method according to the embodiment of the present disclosure mainly changes a serial number when the second key is being verified, and then uses the changed serial number as an input of the second key for verifying an identity of the consumable chip.

Specifically, in an embodiment, as shown in FIG. 1, the second key verification includes steps S1 to S5.

At 51, an imaging device sends a reading instruction for serial number reading, and a consumable chip receives the instruction for serial number reading.

In the embodiments, the imaging device may include, but is not limited to, a printer, a copier, a facsimile machine, a word processor, a multifunction machine, or the like.

At S2, the consumable chip sends, a first serial number based on the reading instruction.

Specifically, each consumable chip has a unique serial number, and the imaging device records a used consumable chip based on its unique serial number. Each serial number corresponds to a set of keys. In the related art, even if two identity verifications are performed, the same serial number is used. However, in the embodiments of the present disclosure, the consumable chip may store keys of a plurality of regions. For example, the number of the regions may be greater than or equal to two. Algorithms for generating keys in each region may be different, and the consumable chip may determine the key of which region is to be called based on a parameter in an identity verification instruction, for example, a first serial number corresponds to a first key, and a second serial number corresponds to a second key.

After the first key is verified to be legal, the imaging device stores a serial number of the consumable chip, i.e., the first serial number, and sends the reading instruction for serial number reading again to perform a second identity verification. In the second key verification, the consumable chip receives the reading instruction for serial number reading, and feeds back the first serial number to the imaging device again, and the imaging device calculates a first verification code based on the first serial number, and feeds back the first verification code to the consumable chip.

At S3, the imaging device receives the first serial number, obtains a first verification code based on the first serial number and sends the first verification code, and the consumable chip sends the first status code in response to the first verification code obtained based on the first serial number.

The consumable chip sending the first status code in response to the first verification code obtained based on the first serial number includes at least two cases. In one case, the consumable chip sends the first status code as long as it receives the first verification code obtained based on the first serial number. In another case, the consumable chip receives the first verification code obtained based on the first serial number, and after waiting for a preset time, sends the first status code. After the consumable chip receives the first verification code, the consumable chip feeds back the first status code to the imaging device regardless of whether the first verification code is legal. In the embodiments, the first status code may be an erroneous status code, an illegal status code, or a status code indicating that the first verification code fed back by the imaging device to the consumable chip is treated by the chip as an illegal verification code. In view of the first status code, the imaging device determines that the reading instruction is invalid, and then sends the reading instruction for serial number reading again. In the embodiments, the consumable chip may change the first serial number into the second serial number after receiving the first verification code.

Specifically, the imaging device obtains status information of the consumable chip based on the first status code. In response to receiving the first verification code, the consumable chip feeds back the erroneous status code to the imaging device. The imaging device may send the reading instruction for serial number reading again after receiving the first status code, and the consumable chip changes the first serial number into the second serial number. That is, in the method according to the embodiments of the present disclosure, during the second identity verification, the consumable chip feeds back the erroneous status code, in such a manner that the imaging device sends the reading instruction again to trigger changing of the serial number.

At S4, the imaging device sends the reading instruction for serial number reading again in response to the first status code. The consumable chip receives the reading instruction for serial number reading again. That is, the first status code may be used to trigger the re-sending and re-receiving of the reading instruction for serial number reading.

At S5, the consumable chip sends the second serial number based on the reading instruction, and the imaging device receives the second serial number, and completes the identity verification based on the second serial number.

In an embodiment, after the consumable chip receives the reading instruction for serial number reading again, the changed second serial number is fed back to the imaging device, and then the consumable chip may have a legal second key for a verification with a key calculated by the imaging device.

Specifically, the imaging device may obtain a second key and a verification code containing the second key based on the second serial number, and send a verification instruction of the verification code containing the second key to the consumable chip. After receiving the verification instruction of the verification code containing the second key, the consumable chip determines whether the verification code containing the second key is legal. If the verification code containing the second key is legal, the consumable chip obtains a second verification code and a second status code based on the second key and the verification instruction of the verification code containing the second key, and feeds the second status code and the second verification code back to the imaging device. The imaging device determines that the consumable chip is a normal state based on the second status code, and obtains the verification code based on the second key. After confirming the second status code, the imaging device determines whether the received second verification code matches a verification code obtained through calculation based on the second key, and if the received second verification code matches the verification code obtained through calculation based on the second key, the imaging device passes the identity verification.

If the consumable chip determines that the verification code containing the second key is illegal, the first status code is sent to the imaging device. The imaging device resends the reading instruction for serial number reading after determining that the first status code has been received.

In the method for identity verification according to the embodiments of the present disclosure, when the second key is being verified, the consumable chip feeds back the first status code after receiving the first verification code, so that the reading instruction for serial number reading may be received again. The changed serial number is fed back to the imaging device, the second serial number is used as an input for calculating the second key, and legality of the consumable chip is determined through verification of the second key. Compared with the related art in which the key is obtained only through a single serial number, the method according to the embodiments of the present disclosure has high challenge of key crack, the improved accuracy in identity verification of the consumable chip and the improved information security of the imaging device.

In the embodiments of the present disclosure, as shown in FIG. 1, the first key verification includes steps S6 to S12.

At S6, the imaging device sends the reading instruction for serial number reading. The consumable chip receives the reading instruction for serial number reading, and sends the first serial number based on the reading instruction.

Specifically, when a consumable box is being installed, the consumable chip is subjected to identity verification by the imaging device for the first time, the imaging device sends the reading instruction for serial number reading to the consumable chip, and the consumable chip feeds back the first serial number to the imaging device after receiving the reading instruction for serial number reading.

At S7, the imaging device receives the first serial number. The imaging device obtains a verification code containing the first key based on the first serial number, and sends a verification instruction of the verification code containing the first key. The consumable chip receives the verification instruction of the verification code containing the first key and obtained based on the first serial number.

At S8, the consumable chip determines whether the verification code containing the first key is legal. If the verification code containing the first key is legal, the consumable chip obtains a third verification code and a second status code based on the first key and the verification instruction of the verification code containing the first key.

At S9, the consumable chip sends the third verification code and the second status code, and completes verification of the first key based on the third verification code and the second status code.

At S10, the imaging device receives the third verification code and the second status code. After confirming the second status code, the imaging device determines whether the received third verification code matches a verification code calculated based on the first key.

At S11, if the received third verification code matches the verification code calculated based on the first key, the imaging device determines that the first key is legal, and sends a reading instruction of reading data information.

At S12, the consumable chip sends the stored data information to the imaging device, the imaging device receives the data information of the consumable chip, and after determining that the data information is legal, the imaging device stores the first serial number. The verification of the first key is completed.

Specifically, after the first key is verified to be legal, the imaging device sends a data reading instruction to the consumable chip. The consumable chip receives the data reading instruction sent by the main control chip, and feeds the stored data information such as a model number of the consumable box, the consumable allowance, and the consumable consumption back to the imaging device. The imaging device determines whether the data information is legal, and if so, the first serial number is stored.

Further, the imaging device sends the reading instruction for serial number reading again to perform the second key verification. In the first key verification, the first serial number has already been recorded at the time of verification of the first key and reading data of the chip. In verification of the second key, the serial number is changed into the second serial number, which is then used for calculating the second key when the second key is being verified, that is, the second key is only used as an identity verification algorithm without affecting the recorded first serial number.

In the embodiments of the present disclosure, in order to ensure the subsequent identity verification of the consumable chip according to the verification process in the above embodiments, when the imaging device is powered on again next time or the consumable chip is installed again, the second serial number is changed into the first serial number, so as to prevent the imaging device from recording the second serial number. In this way, the first serial number that uniquely identifies the consumable chip is recorded every time, and the above identity verification process is performed. In the embodiments, the second serial number only participates in the verification process.

Figure 2:
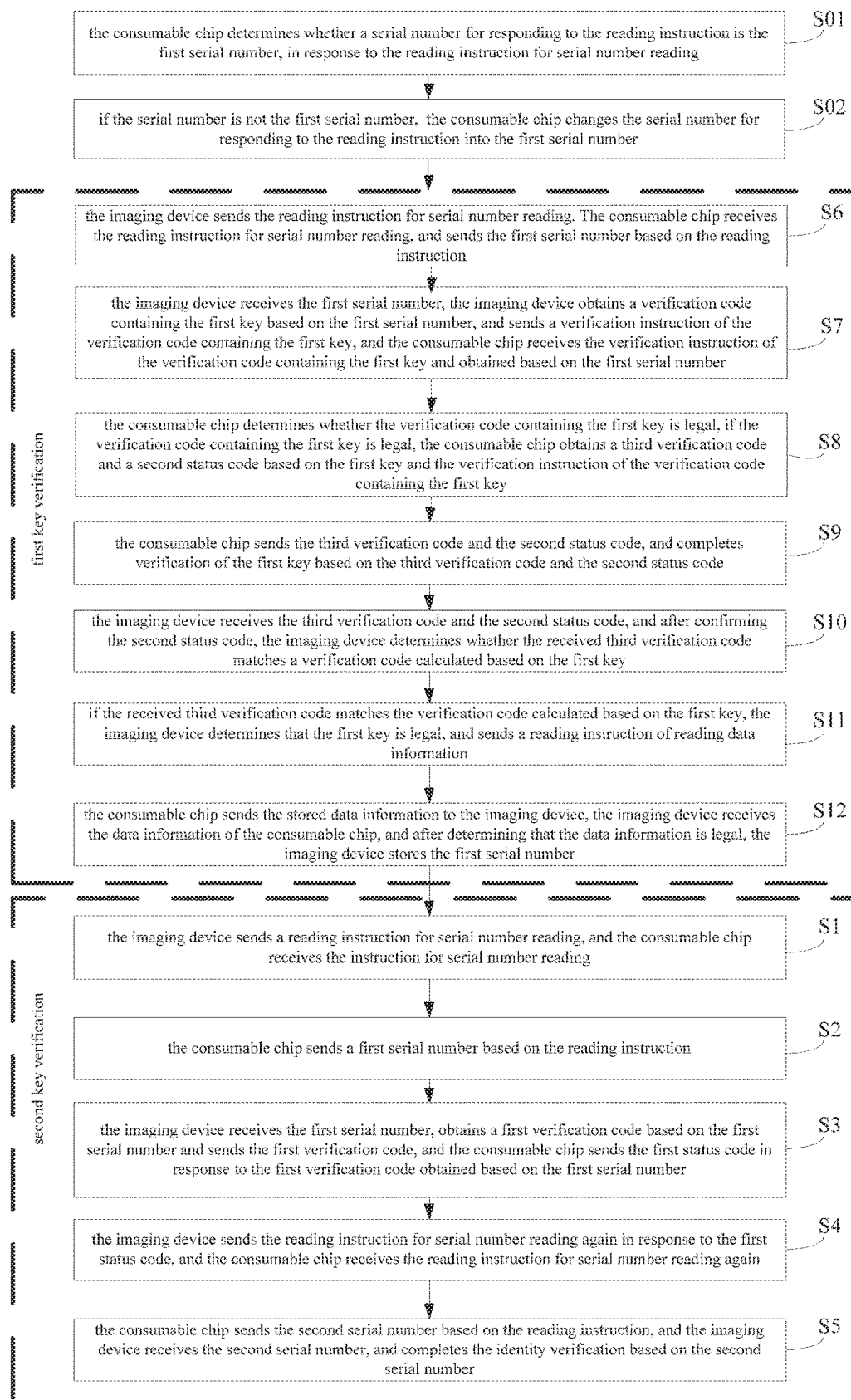
FIG. 2 is a flowchart of a method for identity according to another embodiment of the present disclosure.

If it is not the first time that the consumable chip is verified, e.g., being re-powered or re-installed, as shown in FIG. 2, the method according to the embodiment of the present disclosure further includes the following steps prior to the first key verification.

At S01, the consumable chip determines whether a serial number for responding to the reading instruction is the first serial number, in response to the reading instruction for serial number reading.

At S02, if the serial number for responding to the reading instruction is not the first serial number, e.g., the second serial number, the consumable chip changes the serial number for responding to the reading instruction into the first serial number.

In the embodiments of the present disclosure, the second serial number is changed into the first serial number, which is the same as the process of changing the first serial number into the second serial number during the verification of the second key. Specifically, the imaging device sends a reading instruction for serial number reading. The consumable chip receives the reading instruction, and feeds back a serial number for responding to the reading instruction, such as a second serial number, to the imaging device. The imaging device receives the second serial number. The imaging device obtains a fourth verification code based on the second serial number and sends the fourth verification code to the consumable chip. The consumable chip receives the fourth verification code calculated by the imaging device based on the second serial number, and feeds back the first status code such as an erroneous status code to the imaging device. The consumable chip changes the serial number used for responding to the reading instruction (i.e., the second serial number) into the first serial number. Therefore, the second serial number is changed into the first serial number, and the imaging device sends the reading instruction for serial number reading again in response to the first status code, which is fed back based on the fourth verification code. In this way, the first key verification and the second key verification are performed, thereby ensuring the effective proceeding of the identity verification.

Figure 3:
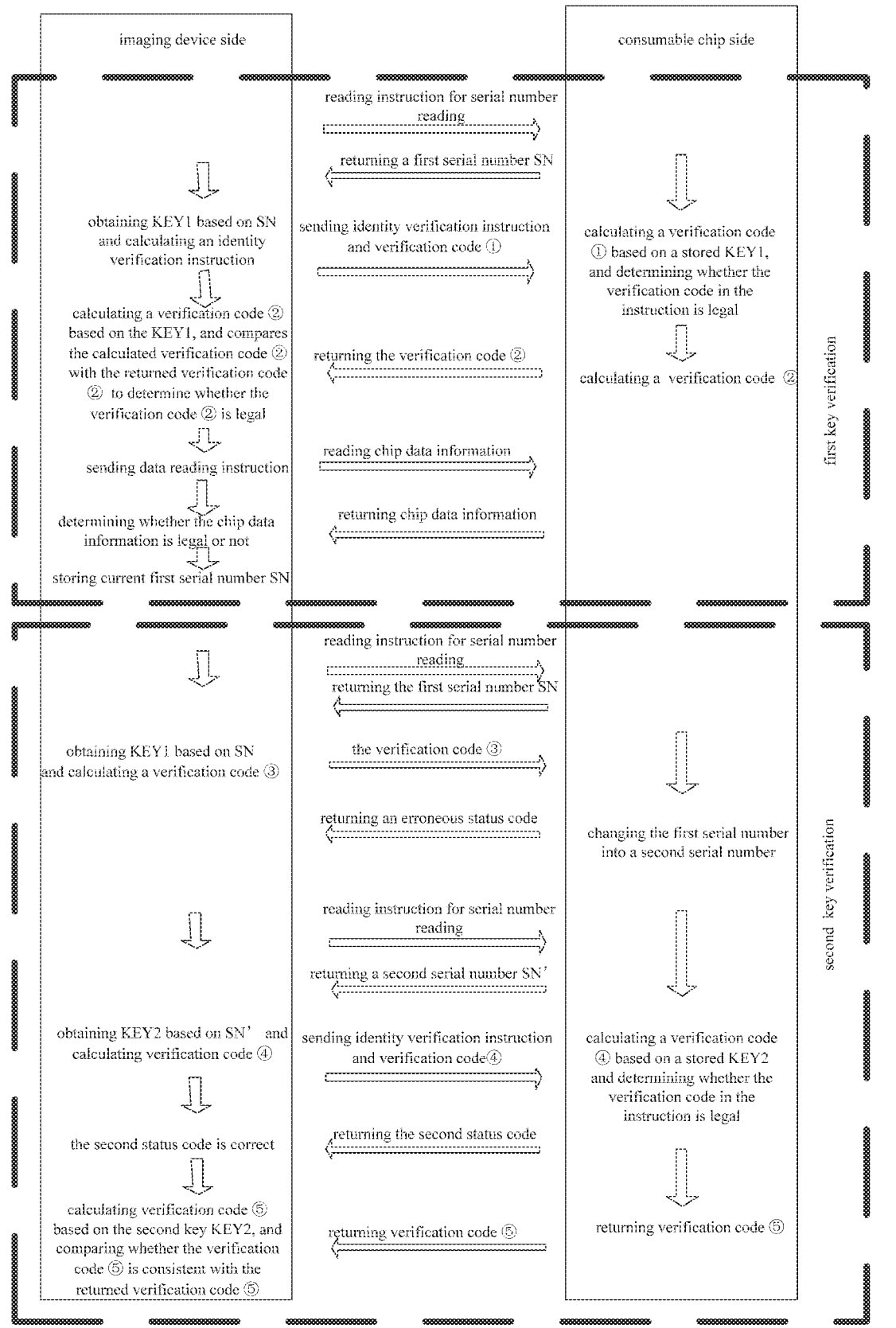
FIG. 3 is a schematic diagram illustrating a data interaction and verification process between a consumable chip and an imaging device according to an embodiment of the present disclosure.

FIG. 3 is a schematic diagram illustrating a data interaction and verification process between a consumable chip and an imaging device according to an embodiment of the present disclosure.

Specifically, as shown in FIG. 3, the imaging device sends the reading instruction for serial number reading to the consumable chip. The consumable chip returns a first serial number SN to the imaging device. The imaging device obtains a first key KEY1 based on the first serial number SN and generates an identity verification instruction. The imaging device sends the identity verification instruction and the verification code containing the first key (e.g., labelled as the verification code ①) to the consumable chip. The consumable chip calculates a verification code ① based on a stored first key KEY1, and determines whether the verification code ① sent by the imaging device is legal. If so, a third verification code, such as a verification code ②, is calculated based on the first key KEY1, and the verification code ② is returned to the imaging device. Moreover, the imaging device calculates a verification code ② based on the first key KEY1, and compares the calculated verification code ② with the verification code ② returned by the consumable chip to determine whether the verification code ② is legal, that is whether the first key KEY1 is legal. If the first key KEY1 is legal, the imaging device sends the data reading instruction to the consumable chip. The consumable chip returns chip data information. The imaging device determines whether the chip data information is legal, and if so, the current first serial number is stored. Then, the imaging device sends the reading instruction for serial number reading again, and the consumable chip returns the first serial number. The imaging device calculates a first verification code such as a verification code ③ based on the first serial number, and sends the verification code ③ to the consumable chip. The consumable chip returns a first status code such as an erroneous status code after receiving the verification code ③, and changes the first serial number into a second serial number. The imaging device confirms the erroneous code and records a number of error times. The imaging device sends the reading instruction for serial number reading again when the number of error times is smaller than a preset number of times. The consumable chip returns a second serial number SN'. The imaging device calculates a second verification code such as verification code ④ based on the second serial number SN', and sends the identity verification instruction and the verification code ④ to the consumable chip. The consumable chip returns the second status code after receiving the verification code ④. When the second status code is correct, the imaging device calculates a second verification code such as verification code ⑤ based on the second key KEY2. Meanwhile, the consumable chip calculates a verification code ⑤ based on a stored second key KEY2, and returns the verification code ⑤ to the imaging device. The imaging device compares whether the calculated verification code ⑤ is consistent with the received verification code ⑤, and if so, the second key is verified, the consumable chip is considered to be legal, and the imaging device is ready and waits for imaging setting.

Figure 4:
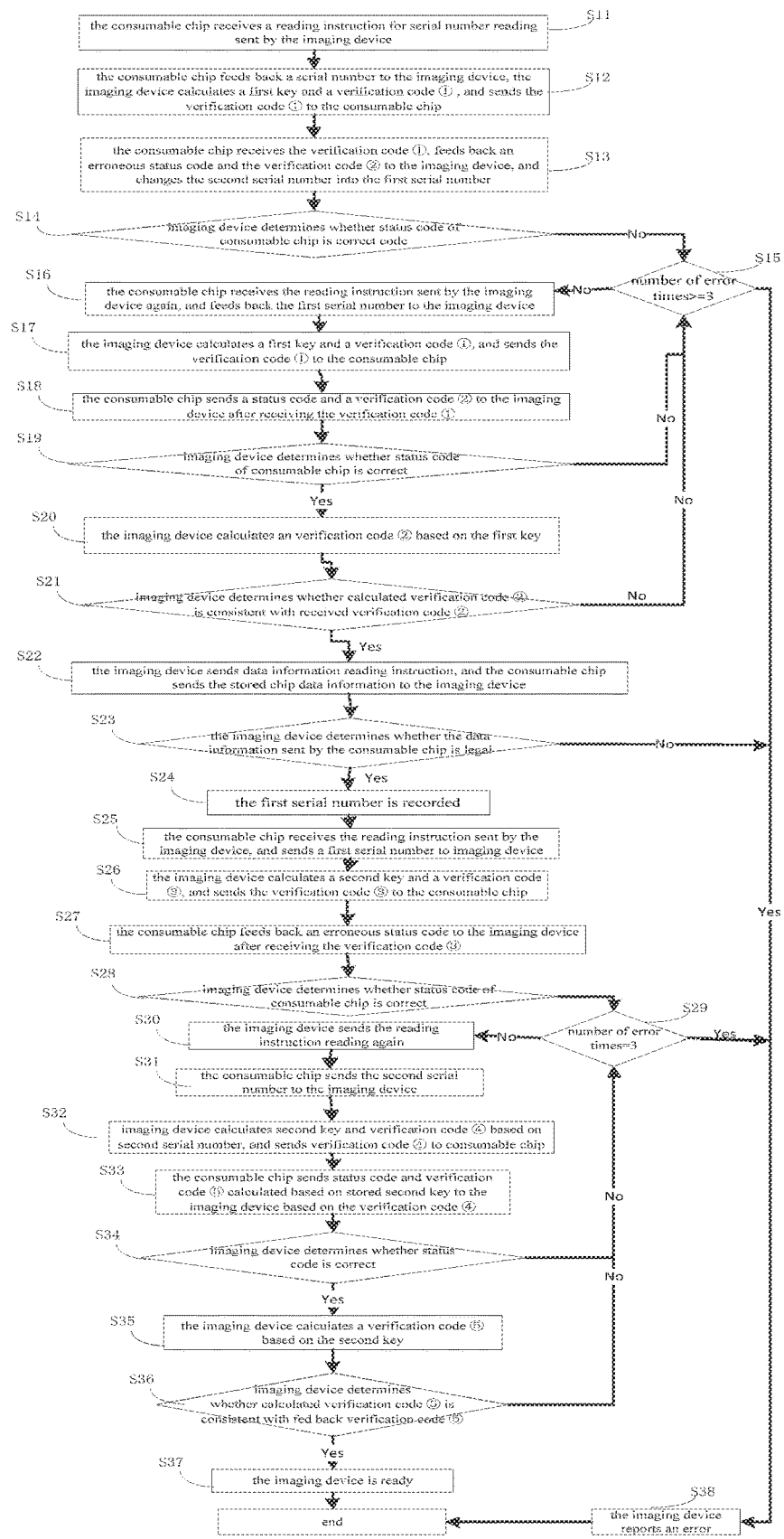
FIG. 4 is a flowchart of a method for identity verification according to an embodiment of the present disclosure.

FIG. 4 is a flowchart of a method for identity verification according to an embodiment of the present disclosure. The identity verification method includes a process of changing a second serial number into a first serial number, a first key verification and a second key verification. As shown in FIG. 4, the identity verification method includes the following steps.

At S11, the consumable chip receives a reading instruction for serial number reading sent by the imaging device.

At S12, the consumable chip feeds back a serial number for responding to the reading instruction to the imaging device. The imaging device calculates a first key and a verification code ① based on the serial number for responding to the reading instruction, and sends the verification code ① to the consumable chip.

At S13, the consumable chip receives the verification code ①, feeds back an erroneous status code in the chip status code and the verification code ② to the imaging device, and changes the second serial number into the first serial number.

At S14, the imaging device determines whether the status code of the consumable chip is a correct code. Because the consumable chip intentionally sends an erroneous code once, the determination result may only be no.

At S15, the imaging device determines whether the number of error times of the status code is greater than the preset number of times, e.g., 3 times, and if not, the method proceeds to step S16, otherwise to step S38.

At S16, the consumable chip receives the reading instruction for serial number reading sent by the imaging device again, and feeds back the first serial number to the imaging device.

At S17, the imaging device calculates a first key and a verification code ① based on the first serial number, and sends the verification code ① to the consumable chip.

At S18, the consumable chip sends a status code and a verification code ② to the imaging device after receiving the verification code ①.

At S19, the imaging device determines whether the status code of the consumable chip is correct, and if so, the method proceeds to step S20, otherwise returns to the step S15.

At S20, the imaging device calculates an verification code ② based on the first key.

At S21, the imaging device determines whether the calculated verification code ② is consistent with the received verification code ②, and if so, the method proceeds to step S22, otherwise returns to the step S15.

At S22, the imaging device sends data information reading instruction, and the consumable chip sends the stored chip data information to the imaging device.

At S23, the imaging device determines whether the data information sent by the consumable chip is legal, and if so, the method proceeds to step S24, otherwise proceeds to the step S38.

At S24, the first serial number is recorded.

At S25, the consumable chip receives the reading instruction for serial number reading sent by the imaging device, and sends the first serial number to the imaging device.

At S26, the imaging device calculates a second key and a verification code ③ based on the first serial number, and sends the verification code ③ to the consumable chip.

At S27, the consumable chip feeds back an erroneous status code to the imaging device after receiving the verification code ③.

At S28, the imaging device determines whether the status code of the consumable chip is correct. Since the consumable chip intentionally sends an erroneous status code, the determination result may only be no, and the process proceeds to step S29.

At S29, the imaging device determines that whether the number of error times of the status code is greater than the preset number of times, e.g., 3, and if so, the method proceeds to step S38, otherwise, proceeds to step S30.

At S30, the imaging device sends the reading instruction for serial number reading again.

At S31, the consumable chip sends the second serial number to the imaging device.

At S32, the imaging device calculates a second key and a verification code ④ based on the second serial number, and sends the verification code ④ to the consumable chip.

At S33, the consumable chip sends the status code and the verification code ⑤ calculated based on the stored second key to the imaging device based on the verification code ④.

At S34, the imaging device determines whether the status code of the consumable chip is correct, and if so, the method proceeds to step S35, otherwise, returns to the step S29.

At S35, the imaging device calculates a verification code ⑤ based on the second key.

At S36, the imaging device determines whether the calculated verification code ⑤ is consistent with the verification code ⑤ fed back by the consumable chip, if not, the method returns to the step S29, and if so, the method proceeds to step S37.

At S37, the imaging device is ready.

At S38, the imaging device reports an error.

When the consumable chip performs identity verification for the first time, the first key and the second key may be verified. That is, the verification may include steps S15 to 38. When it is not the first time that the consumable chip is verified, such as being re-powered or re-installed, the verification may include steps S11 to S38.

In general, with the method for identity verification according to the embodiments of the present disclosure, in verification of the second key, based on a retransmission mechanism of the imaging device and a rule of recording a serial number, an invalid or erroneous status code is fed back by the consumable chip, the serial number is changed and the changed serial number is used as an input for calculating the second key, so that a verification logic is improved, the identity verification of the consumable chip is more accurate, the second key is not easy to decipher, and the security of the imaging information of the imaging device is improved.

Based on the method for verifying the identity of the consumable chip in the above embodiments, a consumable box according to an embodiment of the present disclosure will be described below with reference to the accompanying drawings.

Figure 5:
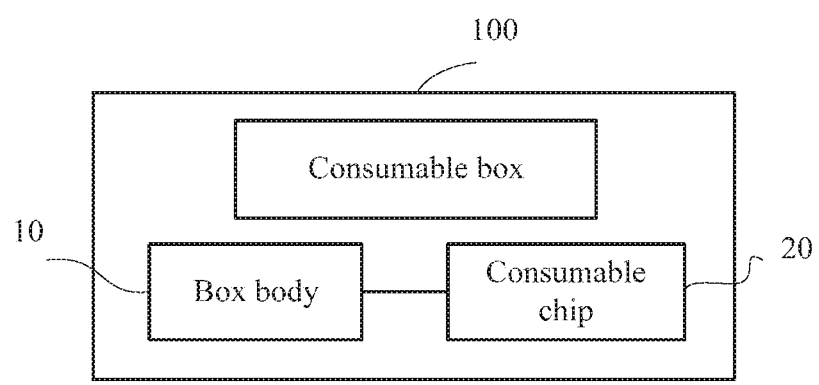
FIG. 5 is a block diagram of a consumable box according to an embodiment of the present disclosure.

FIG. 5 is a block diagram of a consumable box according to an embodiment of the present disclosure. As shown in FIG. 5, a consumable box 100 according to the embodiments of the present disclosure includes a box body 10 and a consumable chip 20 arranged on the box body. The method for identity verification according to the above embodiments is applied for identity verification of the consumable chip 20.

Specifically, first and second keys of two regions may be stored in the consumable chip 20. The key of which region is to be called is determined based on the parameters in the verification instruction sent by the imaging device. In verification of the first key, the consumable chip sends a first serial number to the imaging device. The imaging device calculates a first key based on the first serial number for verification with the first key of the consumable chip. In verification of the second key, the consumable chip triggers a retransmission mechanism of the reading instruction of the imaging device by feeding back an invalid or erroneous status code, and changes the serial number. The consumable chip changes the first serial number into the second serial number, and calculates the second key based on the second serial number, so that the consumable chip 20 has a legal second key for verification with the key of the imaging device, and then the consumable chip 20 feeds back the second serial number to the imaging device. The imaging device calculates a second key based on the second serial number to implement the verification of the second key. Reference may be made to the description of the above embodiments for details of the verification.

For the consumable box 100 according to the embodiments of the present disclosure, the consumable chip 20 thereof adopts the method for identity verification of the above embodiments, so that the accuracy of identity verification of the consumable chip 20, the verification logic and safety may be improved.

A computer readable storage medium according to the embodiments of the present disclosure has a computer program stored thereon. The computer program is configured to, when being executed, may perform the method for identity verification according to the above embodiments, such as the method for identity verification of the consumable chip side and the method for identity verification of the imaging device side.

In the description of the specification, references to the description of "one embodiment", "some embodiments", "an example", "a specific example", or "some examples" or the like mean that a particular feature, structure, material, or characteristic described in connection with the embodiment or example is included in at least one embodiment or example of the present disclosure. In the present specification, the schematic representations of the terms used above are not necessarily intended to refer to the same embodiment or example. Moreover, the specific features, structures, materials, or characteristics described may be combined in any suitable manner in any one or more embodiments or examples. Moreover, various embodiments or examples and features of various embodiments or examples described in the present specification can be combined by any person skilled in the art without being mutually inconsistent.

In addition, descriptions such as "first" and "second" may be for illustrative purposes only, and cannot be understood as indicating or implying the relative importance or implicitly indicating the number of indicated technical features. Therefore, the features defined as "first" and "second" may explicitly or implicitly include at least one of the features. In the description of the present disclosure, "a plurality of" means at least two, e.g., two, and three and so on, unless it may be specifically defined otherwise.

Any process or method descriptions in flow charts or otherwise described herein may be understood as representing modules, segments, or portions of codes which include one or more executable instructions for implementing steps or processes of a custom logic function, and alternate implementations are included within the scope of the embodiments of the present disclosure in which functions may be executed out of order from that shown or discussed, including substantially concurrently or in reverse order, depending on the functionality involved, as would be understood by any person skilled in the art of the present disclosure.

Logic and/or steps shown in the flow charts or otherwise described herein, for example, an ordered listing of executable instructions that can be considered to implement logical functions, can be embodied in any computer-readable medium for use by or in connection with an instruction execution system, apparatus, or device (such as a computer-based system, a processor-containing system, or other system that can fetch and execute instructions from the instruction execution system, apparatus, or device). For the purposes of the present specification, a "computer-readable medium" can be any means that can contain, store, communicate, propagate, or transport the program for use by or in connection with the instruction execution system, apparatus, or device. More specific examples (a non-exhaustive list) of the computer-readable medium may include: an electrical connection (electronic device) having one or more wires, a portable computer diskette (magnetic device), a random access memory (RAM), a read-only memory (ROM), an erasable programmable read-only memory (EPROM or flash memory), an optical fiber device, and a portable compact disc read-only memory (CDROM). In addition, the computer-readable medium may even be paper or another suitable medium upon which the program is printed, as the program can be electronically achieved by for instance optical scanning of the paper or other medium and performing compiling, interpretation or otherwise processing in a suitable manner if necessary, and then is stored in a computer memory.

It should be understood that parts of the present disclosure may be implemented in hardware, software, firmware, or a combination thereof. In the above embodiments, multiple steps or methods may be implemented in software stored in a memory and executed by a suitable instruction execution system or firmware. For example, if implemented in hardware, as in another embodiment, any one or combination of the following techniques, which are well known in the art, may be used: a discrete logic circuit having a logic gate circuit for implementing a logic function on a data signal, an application specific integrated circuit having an appropriate combinational logic gate circuit, a programmable gate array (PGA), a field programmable gate array (FPGA), or the like.

It will be understood by any person skilled in the art that all or part of the steps carried in the method of implementing the above embodiments may be implemented by related hardware under control of a program, which may be stored in a computer readable storage medium. The program, when being executed, includes one or a combination of the steps of the method embodiments.

In addition, all functional units in each embodiment of the present disclosure may be integrated into one processing module, or each unit may exist alone physically, or two or more units are integrated into one module. The integrated module can be implemented either in a hardware form, or in a form of a software functional module. The integrated module, if implemented in the form of the software functional module and sold or used as a separate product, may also be stored in a computer-readable storage medium.

The storage medium mentioned above may be a read-only memory, a magnetic disk or optical disk, etc. Although embodiments of the present disclosure have been shown and described above, it will be understood that the above embodiments are exemplary and not to be construed as limiting the present disclosure, and that changes, modifications, substitutions and variations in the above embodiments may be made by any person skilled in the art within the scope of the present disclosure.

What is claimed is:

1. A method for identity verification, comprising a first key verification and a second key verification, wherein the second key verification comprises:
   receiving, by a consumable chip, a reading instruction for serial number reading;
   sending, by the consumable chip, a first serial number based on the reading instruction;
   sending, by the consumable chip, a first status code in response to a first verification code, wherein the first verification code is obtained based on the first serial number and the first status code is invalid and used to trigger re-sending and re-receiving of the reading instruction for serial number reading;
   receiving again, by the consumable chip, the reading instruction for serial number reading; and
   sending, by the consumable chip, a second serial number based on the reading instruction, and completing the identity verification based on the second serial number,
   wherein the method further comprises in the second key verification, after receiving the first verification code by the consumable chip:
   changing, by the consumable chip, the first serial number into the second serial number.

2. The method according to claim 1, wherein said completing the identity verification based on the second serial number comprises:
   receiving, by the consumable chip, a verification instruction of a verification code containing a second key and obtained based on the second serial number;
   obtaining, by the consumable chip, a second verification code and a second status code based on the second key and the verification instruction of the verification code containing the second key; and
   sending, by the consumable chip, the second verification code and the second status code, and completing the identity verification based on the second verification code and the second status code.

3. The method according to claim 2, further comprising, prior to sending, by the consumable chip, the second verification code and the second status code:
   determining, by the consumable chip, whether the verification code containing the second key is legal; and
   generating, by the consumable chip, the second verification code and the second status code, in response to determining that the verification code of the second key is legal.

4. The method according to claim 1, wherein the first key verification comprises:
   receiving, by the consumable chip, the reading instruction for serial number reading;

sending, by the consumable chip, the first serial number based on the reading instruction;

receiving, by the consumable chip, a verification instruction of a verification code containing a first key and obtained based on the first serial number;

determining, by the consumable chip, whether the verification code containing the first key is legal;

obtaining, by the consumable chip, a third verification code and a second status code based on the first key and the verification instruction of the verification code containing the first key, in response to determining that the verification code containing the first key is legal; and sending, by the consumable chip, the third verification code and the second status code, and completing, by the consumable chip, verification of the first key based on the third verification code and the second status code.

5. The method according to claim 4, further comprising, prior to verifying the first key:

determining, by the consumable chip in response to the reading instruction for serial number reading, whether a serial number for responding to the reading instruction is the first serial number or not; and in response to determining that the serial number for responding to the reading instruction is not the first serial number, changing, by the consumable chip, the serial number for responding to the reading instruction into the first serial number.

6. The method according to claim 5, wherein said changing, by the consumable chip, the serial number for responding to the reading instruction into the first serial number comprises:

sending, by the consumable chip, the serial number for responding to the reading instruction; and feeding back, by the consumable chip in response to receiving a fourth verification code obtained based on the serial number for responding to the reading instruction, the first status code; and changing, by the consumable chip, the serial number for responding to the reading instruction into the first serial number.

7. The method according to claim 1, wherein the first key verification is preformed prior to the second key verification.

8. A method for identity verification, comprising a first key verification and a second key verification, wherein the second key verification comprises:

sending, by an imaging device, a reading instruction for serial number reading;

receiving, by the imaging device, a first serial number; obtaining, by the imaging device, a first verification code based on the first serial number; sending, by the imaging device, the first verification code, and feeding back, by a consumable chip, a first status code in response to the first verification code, wherein the first status code is invalid and is used to trigger re-sending and re-receiving of the reading instruction for serial number reading;

sending again, by the imaging device in response to the first status code, the reading instruction for serial number reading; and receiving, by the imaging device, a second serial number, and completing the identity verification based on the second serial number, wherein in the second key verification, the first serial number is changed into the second serial number by the consumable chip after receiving the first verification code.

9. The method according to claim 8, wherein said completing the identity verification based on the second serial number comprises:

obtaining, by the imaging device, a verification code containing a second key based on the second serial number, and sending, by the imaging device, a verification instruction of the verification code containing the second key;

receiving, by the imaging device, a second verification code and a second status code, the second verification code and the second status code being obtained based on the second key and the verification instruction of the verification code containing the second key;

determining whether the received second verification code matches a verification code calculated based on the second key, in response to the second status code being confirmed; and passing, by the imaging device, the identity verification, in response to determining that the received second verification code matches the verification code calculated based on the second key.

10. The method according to claim 8, wherein the first key verification comprises:

sending, by the imaging device, the reading instruction for serial number reading;

receiving, by the imaging device, the first serial number; obtaining, by the imaging device, a verification code containing a first key based on the first serial number; and sending, by the imaging device, a verification instruction of the verification code containing the first key;

receiving, by the imaging device, a third verification code and a second status code, the third verification code and the second status code being obtained based on the first key and the verification instruction of the verification code containing the first key;

determining, by the imaging device, whether the received third verification code matches a verification code calculated based on the first key, in response to the second status code being confirmed;

determining, by the imaging device, that the first key is legal, in response to determining that the received third verification code matches the verification code calculated based on the first key;

sending, by the imaging device, a reading instruction for reading data information; and receiving, by the imaging device, data information of the consumable chip, and after determining that the data information of the consumable chip is legal, storing the first serial number.

11. The method according to claim 8, wherein the first key verification is preformed prior to the second key verification, and the method further comprises, prior to the first key verification:

sending, by the imaging device, the reading instruction for serial number reading;

receiving, by the imaging device, the second serial number; obtaining, by the imaging device, a fourth verification code based on the second serial number; and sending, by the imaging device, the fourth verification code; and sending again, by the imaging device in response to the first status code fed back based on the fourth verification code, the reading instruction for serial number reading.

12. The method according to claim 8, wherein the consumable chip is arranged on a box body of a consumable box.

13. The method according to claim 8, wherein the first key verification is preformed prior to the second key verification.

14. A consumable box, comprising:
   a physical box body; and
   a consumable computer chip arranged on the physical box body and configured to perform an identity verification comprising a first key verification and a second key verification, wherein the consumable computer chip is configured to in the second key verification:
   receive a reading instruction for serial number reading;
   send a first serial number based on the reading instruction;
   send a first status code in response to a first verification code, the first verification code being obtained based on the first serial number, and the first status code being invalid and used to trigger re-sending and re-receiving of the reading instruction for serial number reading;
   receive again the reading instruction for serial number reading; and
   send a second serial number based on the reading instruction, and complete the identity verification based on the second serial number, wherein the consumable computer chip is further configured to, in the second key verification, change the first serial number into the second serial number after receiving the first verification code.

* * * * *